Nov. 4, 1930.  A. JOSEPH  1,780,159
APPARATUS FOR THE HOT PURIFICATION OF GASES
Filed July 30, 1928
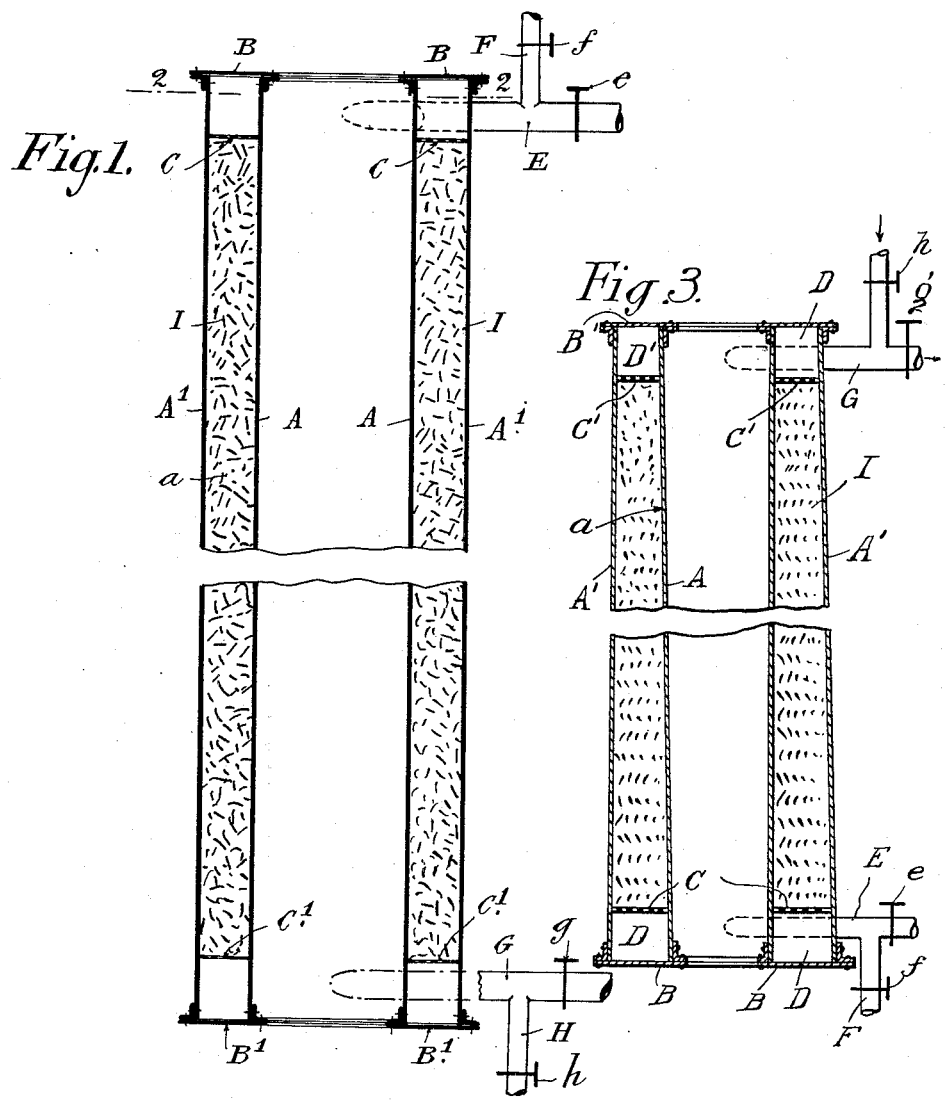
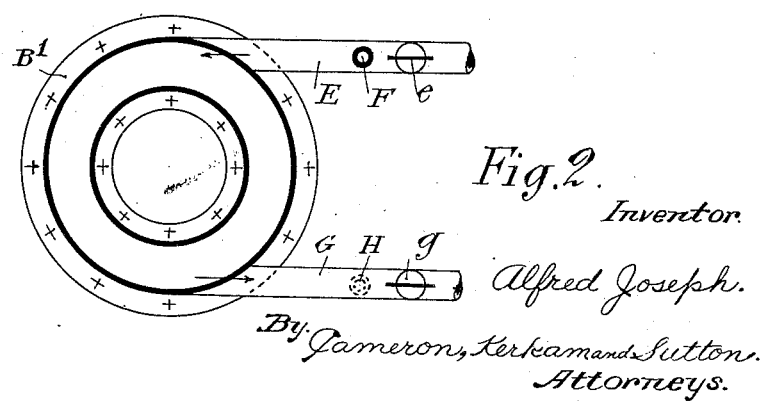
Inventor
Alfred Joseph.
By Cameron, Kerkam and Sutton.
Attorneys.

Patented Nov. 4, 1930

1,780,159

UNITED STATES PATENT OFFICE

ALFRED JOSEPH, OF ENGHEIN, FRANCE, ASSIGNOR TO COMPAGNIE INTERNATIONALE POUR LA FABRICATION DES ESSENCES ET PETROLES, OF PARIS, FRANCE, A COMPANY OF FRANCE

APPARATUS FOR THE HOT PURIFICATION OF GASES

Application filed July 30, 1928, Serial No. 296,288, and in France October 6, 1927.

This invention relates to elements of apparatus for the hot purification of distillation, pyrogenation and other gases, particularly for their subsequent enrichment by hydrogen.

It is known that the gases derived from the distillation or the pyrogenation of coal, lignites, peats, tars or other carbonaceous materials can be used, in particular for the manufacture of light hydrocarbons, only after a preliminary purification, chiefly a desulphurization as complete as possible.

Such desulphurization is effected generally by means of metals such as nickel, copper, etc., or of oxides or suboxides capable of readily forming sulphides with the sulphur contained in the gaseous mass to be purified. The sulphides formed must be able to be periodically dissociated for the elimination of the sulphur, in other words the purifying agent must be regenerated. This operation is most simply effected by means of a current of air or oxygen which, by eliminating the sulphur of the sulphides, gives rise to the formation of sulphurous anhydride and oxides. Now, the regeneration in practice is effected only by means of a very considerable elevation of temperature, which is in the first place usually inadmissible in an industrial plant wherein the purifying apparatuses form part of a group comprising amongst others, in its immediate vicinity, for example catalytic apparatuses. However, the main inconvenience of an excessive elevation of temperature is to be seen in the fact that the purifying agent or the carrier fuses and, therefore, is no longer in the state of fine subdivision indispensable for effective action. This therefore leads, in order to avoid the excessive elevation of temperature, to slowing the regeneration and thereby retarding the instant at which the purifying apparatus is able to be restored to active service. This results in a great inconvenience and a loss of time in the entire series of industrial operations of which the purifying constitutes a phase.

The subject of the present invention is a manner of construction of the purifying apparatuses which entirely suppresses the above disadvantages.

The invention consists, in principle, in locating the purifying material, constituted in the known manner of a subdivided metal or oxide, mounted on a carrier of porous material, porcelain or otherwise, in passages of annular section, offering an enveloped radiating surface additional to the enveloping radiating surface. In this manner the mass subjected to the action of the regenerating stream of air is enabled not to become heated to beyond the desired degree, by virtue of suitable cooling, by radiation simultaneously towards the exterior and towards the axis of the apparatus.

The invention is illustrated diagrammatically in the accompanying drawings, wherein Figs. 1 and 2 are respectively a sectional elevation and a plan view of one embodiment of the invention and Fig. 3 is a sectional elevation of another embodiment.

In practice, the purifying elements can be constituted, most simply, by two coaxial tubes A, $A^1$, leaving between them an annular space $a$, closed at its two ends by annular covers or bases B, $B^1$, as shown, by way of example, in sectional elevation and sectional plan along the line 2—2 of Fig. 1, in Figs. 1 and 2 of the accompanying drawing. The purifying mass of known composition, such as nickel in the finely divided state for example mounted on a porous carrier, is disposed in the space $a$ between two grids C, $C^1$ in the form of bricks, small tubes or other appropriate form, leaving at the ends of the annular purifying element, two chambers D, $D^1$, respectively for the inlet of the gases to be purified and the outlet of the residual gases from regeneration on the one hand, and the outlet of the purified gases as well as the inlet of the regenerating air or oxygen on the other hand. E is an inlet pipe for gas, provided with a cut-off cock $e$, and from which is branched a pipe F, for the outlet of the gases ($SO_2+N_2$) derived from the regeneration; this pipe, preferably tangential to the annular element, is obviously provided with a cut-off cock $f$. G—$g$ indicates an outlet pipe for the purified gases, from which is branched an inlet pipe (H—$h$) for air or oxygen.

As can be seen, the purifying element thus constructed comprises an external enveloping radiating surface $A^1$, to which is added the internal enveloped radiating surface A. It is necessary, for obtaining the desired result, that the width of the annular space, the distance between the walls $A^1$ and A, be kept sufficiently small that the median zone of the said space, which is at the highest temperature, is not unduly distant from the radiating walls. Thus, for example, a purifying element the enveloped wall A of which has an internal diameter of about 300 millimetres, should have an annular space of about 100 millimetres in width, the diameter of the external envelope $A^1$ being about 500 millimetres.

With purifying elements like that described, the critical temperature of fusion of the purifying metal or of the carrier thereof is certain not to be attained, whilst at the same time regeneration is effected in far less time than with elements of the same capacity of full section.

It is obvious that the envelopes A and $A^1$, which bound the annular space, instead of being constituted by straight cylinders of circular section, may have any other suitable geometrical form; an annular space could for example be provided between two undulating or star section walls, should it be considered necessary to increase further the enveloping and enveloped radiating surfaces.

It is not absolutely indispensable that the walls A and $A^1$ have parallel generatrices, in other words that the size of the annular space $a$ be constant throughout the entire height or length of the purifying elements. A size of annular space could be adopted increasing progressively from the zone wherein the temperature tends to become most elevated, as indicated in Fig. 3.

The described purifying elements may be employed in the form of batteries of elements in series, series-parallel or otherwise, and in various numbers, according to the particular application for which they are intended. The elements may be provided with any additional pipes and cocks which a regeneration not effected exclusively by means of air or oxygen may require.

Claims:

1. Apparatus for the purification of distillation gases comprising inner and outer tubular walls providing an annular space therebetween for the passage of distillation gases to be purified and said inner wall providing an open space enclosed therein, whereby heat is radiated from the surfaces of both of said walls, means forming annular chambers adjacent the ends of said walls for conducting gases to and from said space, and means for severally conducting and discharging distillation gases to be purified and regenerating gases to and from said chambers.

2. Apparatus for the purification of distillation gases comprising inner and outer tubular walls, means including an annular grid extending between said walls to define a chamber adapted to contain a purifying agent, and a cover for said walls forming with said grid an annular space for conducting gases to said chamber, said inner wall enclosing an open space whereby heat is radiated from the surfaces of both inner and outer walls.

3. Apparatus for the purification of distillation gases comprising inner and outer tubular walls, a pair of annular grids between said walls defining a chamber adapted to contain a purifying material, covers for the ends of said walls forming with said grids annular inlet and outlet chambers, and conduits for conducting gases to and from said inlet and outlet chambers, said inner wall enclosing an open space whereby heat is radiated from the surfaces of both inner and outer walls.

4. Apparatus for the purification of distillation gases comprising inner and outer tubular walls defining therebetween an annular chamber adapted to contain purifying material, an annular grid at each end of said chamber, end covers for said walls defining with said grids annular end chambers, and means for conducting gases to and from said end chambers, the inner wall being open at both ends to provide a passage for cooling air.

5. Apparatus for the purification of distillation gases comprising inner and outer tubular walls defining therebetween an annular chamber adapted to contain purifying material, an annular grid at each end of said chamber, end covers for said walls defining with said grids annular end chambers, means for conducting and discharging distillation gases from said end chambers and means for conducting and discharging regenerating gases from said end chambers, the inner tubular wall being open at both ends to provide a passage for cooling air.

6. Apparatus for the purification of distillation gases comprising inner and outer tubular walls defining therebetween an annular chamber adapted to contain purifying material, the diameter of at least one of said walls progressively varying between its ends, an annular grid at each end of said chamber, end covers for said walls defining with said grids annular end chambers, and means for conducting gases to and from said end chambers, the inner wall enclosing an open space therein for the radiation of heat.

In testimony whereof I have signed this specification.

ALFRED JOSEPH.